United States Patent
Mulholland et al.

(10) Patent No.: US 11,954,331 B2
(45) Date of Patent: Apr. 9, 2024

(54) STORAGE SYSTEM WORKLOAD SCHEDULING FOR DEDUPLICATION

(71) Applicant: International Business Machines Corporation, Armonk, NY (US)

(72) Inventors: Miles Mulholland, Eastleigh (GB); Anuj Chandra, Pune (IN); Kirsty G. Rodwell, Winchester (GB); Jorden Luke Allcock, Sale (GB)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 17/450,204

(22) Filed: Oct. 7, 2021

(65) Prior Publication Data

US 2023/0112338 A1   Apr. 13, 2023

(51) Int. Cl.
  *G06F 3/06*    (2006.01)
  *G06F 9/48*    (2006.01)
  *G06F 16/22*   (2019.01)
  *G06F 16/23*   (2019.01)

(52) U.S. Cl.
  CPC .......... *G06F 3/0608* (2013.01); *G06F 3/0641* (2013.01); *G06F 3/0673* (2013.01); *G06F 9/4881* (2013.01); *G06F 16/2255* (2019.01); *G06F 16/2358* (2019.01)

(58) Field of Classification Search
  CPC ............... G06F 3/0608; G06F 16/2255; G06F 16/2358; G06F 3/0641; G06F 3/0673; G06F 9/4881
  USPC ........................................................ 707/692
  See application file for complete search history.

(56) References Cited

U.S. PATENT DOCUMENTS

| | | |
|---|---|---|
| 8,095,756 B1 | 1/2012 | Somavarapu et al. |
| 8,886,613 B2 | 11/2014 | Doerner |
| 9,928,249 B2 | 3/2018 | Lewis et al. |
| 10,235,396 B2 | 3/2019 | Ioannou et al. |
| 10,540,341 B1 * | 1/2020 | Wakhare ............ G06F 16/2365 |

(Continued)

FOREIGN PATENT DOCUMENTS

| | | |
|---|---|---|
| CN | 104050057 A | 9/2014 |
| CN | 105824881 A | 8/2016 |

(Continued)

OTHER PUBLICATIONS

Kachmar et al., "A Smart Background Scheduler for Storage Systems," arXiv:2006.01402v1 [cs.DC] Jun. 2, 2020, 9 pgs.

(Continued)

*Primary Examiner* — Hosain T Alam
*Assistant Examiner* — Nicholas E Allen
(74) *Attorney, Agent, or Firm* — Kelli D. Morin

(57) ABSTRACT

A computer-implemented method enables workload scheduling in a storage system for optimized deduplication. The method includes determining dynamic correlations of deduplications between workload processes in a prior time window. Workload processes include one or more tasks with defined execution timing parameters. The method further includes determining deduplication ratios based on the correlations of the deduplications between the workload processes. The method further includes scheduling multiple workload processes based on a highest determined deduplication ratio of the determined deduplication ratios.

19 Claims, 8 Drawing Sheets

(56) References Cited

U.S. PATENT DOCUMENTS

| | | | |
|---|---|---|---|
| 2016/0132523 A1* | 5/2016 | Traeger | G06F 16/1748 |
| | | | 707/692 |
| 2018/0107518 A1* | 4/2018 | Aronovich | G06F 9/5005 |
| 2019/0361626 A1* | 11/2019 | East | G06F 3/0653 |
| 2020/0319811 A1 | 10/2020 | Wang et al. | |
| 2020/0356292 A1* | 11/2020 | Ippatapu | G06F 11/1453 |
| 2021/0081298 A1* | 3/2021 | Gardner | G06F 11/3419 |
| 2021/0117261 A1 | 4/2021 | Ugale et al. | |
| 2021/0149718 A1* | 5/2021 | Doddaiah | G06F 9/5016 |
| 2021/0173710 A1* | 6/2021 | Crossley | G06F 9/45558 |
| 2021/0182190 A1* | 6/2021 | Gao | G06F 12/0246 |
| 2021/0232500 A1* | 7/2021 | Butt | G06F 12/0253 |
| 2021/0240529 A1* | 8/2021 | Jain | G06F 13/18 |
| 2021/0286534 A1 | 9/2021 | Mulholland et al. | |
| 2021/0303985 A1* | 9/2021 | Lakshmikantha | G06N 3/044 |
| 2022/0101086 A1* | 3/2022 | Cappetta | G06T 7/11 |

FOREIGN PATENT DOCUMENTS

| | | |
|---|---|---|
| CN | 111857995 A | 10/2020 |
| JP | 2019016293 A | 1/2019 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

International Search Report and Written Opinion, International Application No. PCT/CN2022/111053, dated Nov. 14, 2022, 9 pgs.

\* cited by examiner

|   | A | B | C | D | E | F | G |
|---|---|---|---|---|---|---|---|
| A |   | 0 | 0 | 150 | 0 | 0 | 850 |
| B | 0 |   | 100 | 40 | 0 | 2 | 650 |
| C | 0 | 100 |   | 1 | 0 | 2 | 50 |
| D | 150 | 40 | 1 |   | 1 | 1 | 700 |
| E | 0 | 0 | 0 | 1 |   | 1 | 5 |
| F | 0 | 2 | 2 | 1 | 1 |   | 1 |
| G | 1000 | 650 | 50 | 700 | 5 | 1 |   |

*FIG. 4A*

| A | B | C | D | E | F | G(1) |
|---|---|---|---|---|---|------|
| 0 | 0 | 0 | 0 | 0 | 0 | 2406 |

*FIG. 4B*

| A(2) | B | C | D | E | F | G(1) |
|------|---|---|---|---|---|------|
| 1000 | 0 | 0 | 0 | 0 | 0 | 1500 |

*FIG. 4C*

| A(2) | B | C | D(3) | E | F | G(1) |
|------|---|---|------|---|---|------|
| 642 | 0 | 0 | 896 | 0 | 0 | 964 |

*FIG. 4D*

STORAGE SYSTEM WORKLOAD SCHEDULING FOR DEDUPLICATION

BACKGROUND

The present disclosure relates to workload scheduling in a storage system, and more specifically, to workload scheduling in a storage system using deduplication.

Thin provisioning is a concept where storage does not wholly allocate the available capacity. Storage is only allocated when it must be used. Both block and file systems utilize equivalents of this concept. File systems are effectively thin provisioned by their nature (files can only be allocated upon creation), and block storage systems can implement thin provisioning using a forward lookup structure to map allocated ranges to the physical storage medium. Storage can either be kept local to a volume or pooled between multiple volumes. Thin provisioning allows the implementation of advanced space saving techniques, such as compression and deduplication, as one need only update the forward lookup structure with the appropriate details (e.g., whether it is compressed, or pointing the forward lookup structure for a virtual address to another forward lookup structure entry containing the data in question).

SUMMARY

According to an aspect of the present disclosure there is provided a computer-implemented method for workload scheduling in a storage system for optimized deduplication. The method includes determining dynamic correlations of deduplications between workload processes in a prior time window. Workload processes include one or more tasks with defined execution timing parameters. The method further includes determining deduplication ratios based on the correlations of the deduplications between the workload processes. The method further includes scheduling multiple workload processes based on a highest determined deduplication ratio of the determined deduplication ratios.

According to another aspect of the present disclosure there is provided a computer system comprising a memory and a processor communicatively coupled to the memory. The processor is configured to perform a method. The method includes determining dynamic correlations of deduplications between workload processes in a prior time window. Workload processes include one or more tasks with defined execution timing parameters. The method further includes determining deduplication ratios based on the correlations of the deduplications between the workload processes. The method further includes scheduling multiple workload processes based on a highest determined deduplication ratio of the determined deduplication ratios.

According to a further aspect of the present disclosure there is provided a computer program product. The computer program product includes a computer readable storage medium having program instructions embodied therewith. The program instructions are executable by processor to cause the processor to perform a method. The method includes determining dynamic correlations of deduplications between workload processes in a prior time window. Workload processes include one or more tasks with defined execution timing parameters. The method further includes determining deduplication ratios based on the correlations of the deduplications between the workload processes. The method further includes scheduling multiple workload processes based on a highest determined deduplication ratio of the determined deduplication ratios.

The computer readable storage medium may be a non-transitory computer readable storage medium, and the computer readable program code may be executable by a processing circuit.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4A depicts a schematic diagram depicting an example embodiment of a data structure, in accordance with embodiments of the present disclosure.

FIG. 4B depicts a schematic diagram depicting an example embodiment of a data structure, in accordance with embodiments of the present disclosure.

FIG. 4C depicts a schematic diagram depicting an example embodiment of a data structure, in accordance with embodiments of the present disclosure.

FIG. 4D depicts a schematic diagram depicting an example embodiment of a data structure, in accordance with embodiments of the present disclosure.

Figure 1:
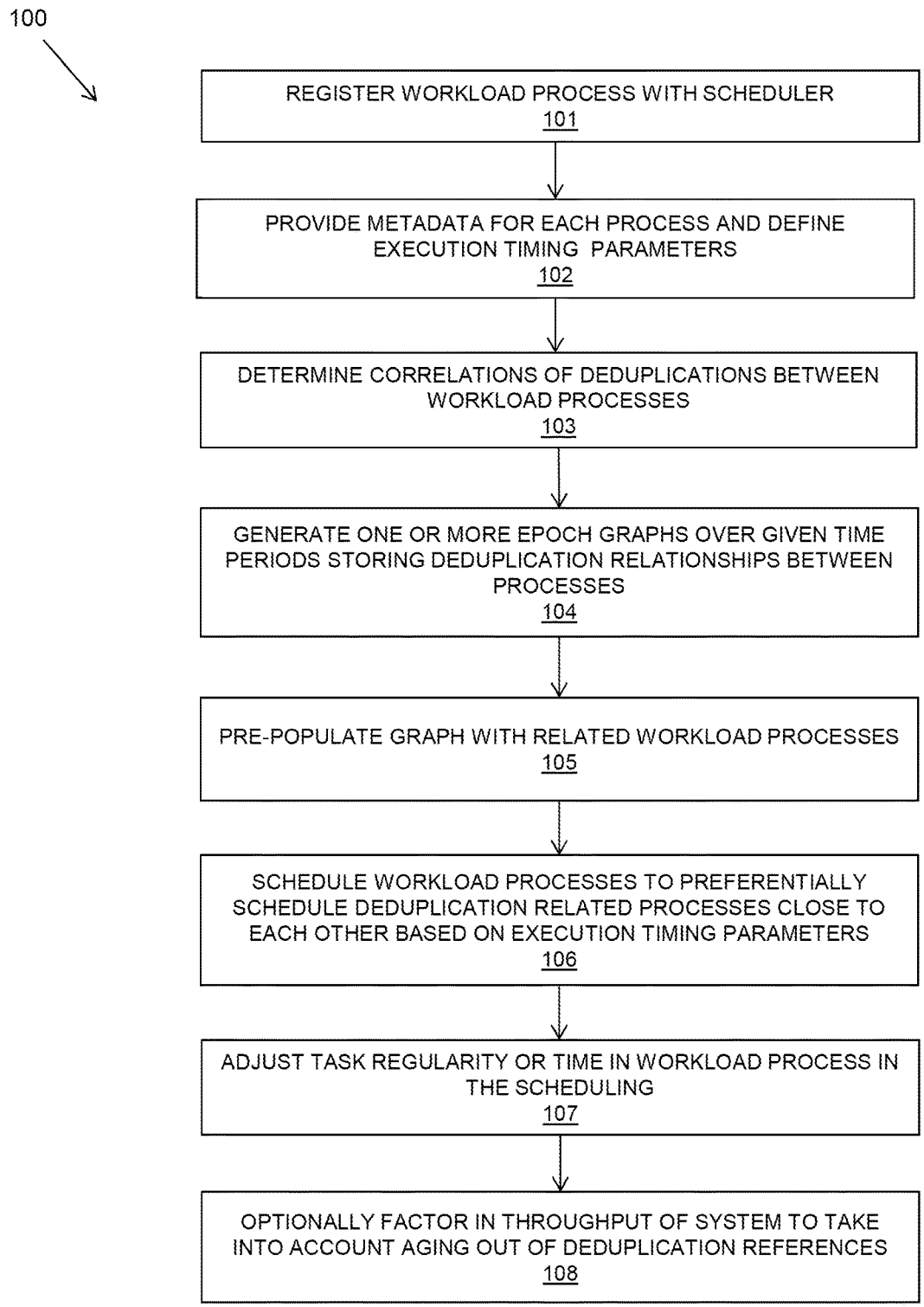
FIG. 1 depicts a flow diagram of an example embodiment of a method, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Deduplication operates by utilizing an in-memory lookup table to contain partial hashes or fingerprints of recent writes. An incoming input/output (IO) operation first performs a hash, using an algorithm like SHA-1 or SHA-256. That hash is then compared against the lookup table to determine if there may be a match in the system for this IO.

If there is a potential match, the potential match is subject to a lookup to determine if the full hash is located in the storage system. If the full hash is located in the storage system, a reference is created for the virtual address and volume that is being attempted to be written to referencing the potential match's location.

The size of the in-memory lookup table is one factor that determines whether or not a deduplication reference is found. In some virtualization storage controllers, a deduplication lookup is limited to the memory available within a cluster, and deduplications can only be performed within an IO group. This is referred to as the deduplication fingerprints database.

Job scheduling is a field slightly different from task scheduling. Job scheduling deals with larger jobs and often in the high-throughput computing domain, whilst task scheduling refers to how individual processes are allocated processing time. Various job schedulers exist, and these can handle the scheduling of long running jobs, typically on high throughput compute clusters. Some of these job schedulers support a concept known as co-scheduling: the principle that certain applications could support co-location on a given compute node. One illustrative example for co-scheduling may be an IO bound process with a central processing unit (CPU) intensive process and a graphics processing unit (GPU) intensive process, as these processes may be able to coexist without negatively interacting with one another.

The described method and scheduling system determine correlations between workload processes and deduplication and use the correlations when scheduling workload processes. The aim is to schedule deduplication correlated workload processes together, either concurrently or in close temporal proximity, such that deduplications are more likely. The result can be referred to as achieving an optimized deduplication ratio.

An optimized deduplication ratio improves the hit rate in the deduplication fingerprints database, which is typically memory limited. This also has the effect of improving read-cache behavior for deduplication reads if these are correlated similarly. Co-scheduling similar workloads increases the chance of finding the data in question already in cache.

Workload processes may include individual tasks or recurring tasks. Workload processes may be in the form of long running process of IO operations. An example of a workload process may be remote copy workloads. However, any batch task or backup task may be subject to the described job scheduling algorithm. Workload processes may be host originated or storage originated and may both be controlled by the described scheduler system.

Referring to FIG. 1, a flow diagram shows an example embodiment of the described method 100 as carried out by a scheduling system. The scheduling system may be provided as part of a storage system in which deduplication is used.

At operation 101 of the method 100, workload processes from hosts and/or storage systems are registered with a scheduling system. This includes, at operation 102, providing metadata associated with each workload process relating to execution timing parameters of the tasks within the workload process. In one embodiment, the execution timing parameters may include a minimum frequency of tasks (for example, how often a task needs to be run, such as daily, hourly, etc.) and an expected duration of the workload process. In another embodiment, the execution timing parameters may define a desired execution time of tasks with a tolerance window to allow for flexible allocation.

Based on the metadata, execution timing parameters are defined for the workload process, such as a task execution window. The execution timing parameters allow for flexibility of task execution in the workload process that is used by the scheduling system to optimize the deduplication.

For example, if there is a backup task that has to be run at least every X hours in order to provide suitable backup, there is leeway on when it may actually run. This is used in the scheduling to optimize deduplication between workloads.

An example workload process may be a long-running process such as a Global Mirror with Change Volumes (GMCV) relationship. The minimum frequency is determined by the desired recovery point objective (RPO), but there may be no harm in it executing more frequently. The duration and throughput will depend on the IO being sent to the volume during the duration, so these may be time-dependent functions. Based on prior history of given operations, these may be estimated either via statistical mechanisms or machine learning approaches.

Additional non-timing execution parameters may also be defined by the metadata. Such parameters may define task targets. For example, copy targets may be defined as execution parameters that are also used to correlate workloads. Parameters relating to the throughput of tasks may also be included in the metadata. Throughput may determine the bandwidth or IO operations per second of a given task. If a task is relatively input/output operations per second (IOPs) intensive, it may not be desirable to schedule it with another task if that would exceed the system's available bandwidth.

At operation 103, the method 100 determines correlations between workload processes relating to deduplications between the processes. For example, the method 100 can determine correlations between workload processes relating to past or prior deduplications. The correlations may be based on recent past deduplications between processes such that the correlations are kept up to date providing dynamic correlations. In this way, dynamic correlations may be determined in a prior time window immediately or closely prior to the current time. This ensures that the deduplication relationship between two workloads that is used for the scheduling is an up to date relationship.

The correlations may be determined when the workload processes execute within a defined time or within a defined throughput of each other. Workload processes can only deduplicate against one another as long as the fingerprints (for example, hashes) are in the deduplication fingerprint database (for example, a hash table), which is memory limited. Fingerprints are aged-out of the database in the event that no deduplications occur. If a workload occurs a long time after another workload, it is possible that it will not deduplicate even if the workloads would otherwise strongly deduplicate against one another, as fingerprints will get aged out of the database before matches can be found.

In one embodiment, correlations may be determined using a two-dimensional (2D) structure such as a table or graph that may be populated describing the correlation between any two given workload processes. The achieved deduplication ratio may be considered and/or utilized here. For example, for a given co-located run, it may be suggested that two processes share deduplication behavior if a high deduplication ratio is achieved. At its most simple, this table may just be a list of achieved deduplication ratios if the processes have run within N minutes of one another or within M terabytes of throughput of one another. (In other words, the deduplication database is believed to still contain the details of this earlier process.)

In another embodiment, a more sophisticated approach of determining correlations may be to tag IOs associated with long running processes in the deduplication database. This would allow the count of deduplication references associated with a given process to be tagged to any process so long as it survived in the deduplication fingerprint database. This would cost a small amount of metadata per reference and could be stored in the forward lookup structures themselves when creating a reference or chunk rather than the database.

At operation 104, the method 100 generates an epoch graph structure for multiple workload processes, with epochs over given time periods, illustrating the deduplication relationships between the multiple registered workload processes. An epoch graph can be described as a slice of an overall correlation graph, for a given time period. The epoch graph structure may include nodes for each workload process with connecting edges representing deduplication ratios between the workload processes.

Over the course of a training period, for example, 24 hours or a week, the number of deduplications between IO processes may be stored in the epoch graph structure. This is an ongoing training period in a time window prior to the current time. In this way, the epoch graphs provide a sliding time window to capture recent behavior separately. In this epoch graph, the edges contain details of the deduplication ratio, such as a total IOs and the total number of deduplicated references. This is the current epoch of the system. Several of these epoch graphs may be stored to give a rolling history of the system and to determine interactions between IO processes.

The epoch graph may be populated as part of the act of performing deduplication. In a simple implementation, a count of deduplication savings between workloads may be stored in the epoch graph.

In accordance with at least one embodiment of the present disclosure, at operation 105, the epoch graph is pre-populated with related workload processes. Prior knowledge may be encoded in the system in this way. This may be determined by user input: for example, two workloads sourced from virtual desktop infrastructure (VDI) environments may be deemed to be similar; or as another example, a workload spawned from a pod of containers may be similar to a prior workload. This is particularly useful for new workloads which may be assumed to have similarities with other related workloads. In accordance with at least one alternative embodiment, the method 100 can proceed from operation 104 to operation 106 without the performance of operation 105.

At operation 106, the method 100 schedules multiple workload processes concurrently or in temporal proximity based on the correlations between workload processes and the defined execution timing parameters of the workload processes to achieve an optimized deduplication ratio. The scheduling may also take into account any additional non-timing execution parameter such as a task target or throughput of a given task.

Scheduling is intended to be continuous with updated epochs and new workload processes affecting the perception of deduplication relationships between workloads and affecting scheduling accordingly.

When scheduling performance of a workload process, such as a long running schedulable write IO operation, the epoch graph is used to preferentially schedule related processes closely to one another, provided they fit within the same possible processing windows of their execution timing parameters. This means that data from these processes are likely to be retained in the deduplication database, and thus have a higher deduplication ratio.

In accordance with at least one embodiment of the present disclosure, at operation 107 of the method 100, the scheduling adjusts the task regularity or time of execution in the workload process as long as it meets any defined minimum or tolerance requirements as defined in the metadata. In accordance with at least one alternative embodiment, the method 100 can proceed from operation 106 to operation 108 without the performance of operation 107.

In accordance with at least one embodiment of the present disclosure, at operation 108 of the method 100, the throughput of the storage system over time and how this throughput may be affected by the scheduling algorithm are factored in. This will affect how quickly deduplication references will age out of the deduplication fingerprint database. In accordance with at least one alternative embodiment, the method 100 does not include the performance of operation 108.

The scheduling approach based on workloads, rather than just from the number of deduplications existing between two given volumes, has advantages. A given volume may initially share many similarities with another volume. However, they may be subject to very different workloads. Two volumes of a same operating system may initially deduplicate very well. However, other workloads later placed upon them may be very different.

An example candidate for the described workload process scheduling is remote copy processes, specifically a GMCV-like volume. The scheduling process may also be determined by the additional execution parameter of the remote copy target (i.e., the secondary/backup site). This allows multiple source sites to be scheduled so as to optimize their deduplication ratios. In the instance of a remote copy volume that must have a minimum cycle type of one day, when the IO for that transfer actually occurs may be not that relevant. This allows the freedom to be more sophisticated with the scheduling of when the IO actually occurs in order to improve deduplication ratios.

The method may also be applicable to host-driven batch processes if they also register their tasks with the scheduler. For example, a backup task is an example of a long running process or indeed any other batch task existing in a given cloud environment.

As the scheduler system knows how workloads correlate against one another, and there is some evidence that a workload on one storage controller may correlate with another location (for example, due to strong deduplication references with replication workloads), then it may be preferable to migrate a workload to a system where similar workloads typically live.

For example, given an overloaded storage system and a selection of migration options for a volume/workload, one could use a technology such as non-disruptive volume migration to move to a controller which is most likely to deduplicate based on the scheduler's data.

The scheduler system may also be leveraged in implementations such as three-site replication to allow scheduling knowledge based on deduplication behavior to be transferred across multiple deduplicating storage systems.

The scheduling may be reduced to a problem known as the "Bin Packing" problem, which finds the optimal pack for jobs given various time windows. This is also closely related to the "Knapsack" problem. The scheduling problem is NP-hard: even finding out whether or not it is possible for a given set of jobs to run concurrently given various constraints is NP-complete. In the described case, it is essentially trying to pack "bags" in a fashion which maximizes the deduplication savings whilst still executing in a given time window or meeting required execution parameters.

Scheduling algorithms may make use of heuristics to solve these problems, as the combinatorial search space is too vast for a brute-force solution. These heuristics can be as simple as first-fit-decreasing. For example, choosing to fit the largest job in the system, placing it into the first time-bin which it fits into, and so on. A simple variant accounting for deduplication would be to initially place a given workload with the highest number of deduplication references associated with it, from the epoch graph constructed above. Following from that, the method may attempt to insert maximally deduplicating workloads in time-bins based on deduplication expectations from the epoch graph. The scheduling algorithm may be made more sophisticated to account for time constraints, bandwidth, and so on.

Certain workloads may benefit from this technique more than others. A container-based or virtual machine (VM) workload may share common IO ranges with other workloads also using such containers or VMs regardless of whether or not the volumes are hosted by the same orchestrator.

A resultant property of the described mechanism is that scheduling of related workload processes together based on their correlated deduplication behavior means that it is highly likely that if workloads create references against one another (for example, by performing writes), they may also perform similar reads (for example, looking up references). By co-scheduling such workloads, the likelihood that a given reference read by one volume already exists in cache from another volume is increased, thus improving the performance of such reads.

The benefits of the described method and system are higher deduplication savings and improved read cache hits on deduplication reference reads for co-scheduled workloads. Job scheduling is optimized on predicted deduplication savings without prior knowledge of data contents.

Figure 2:
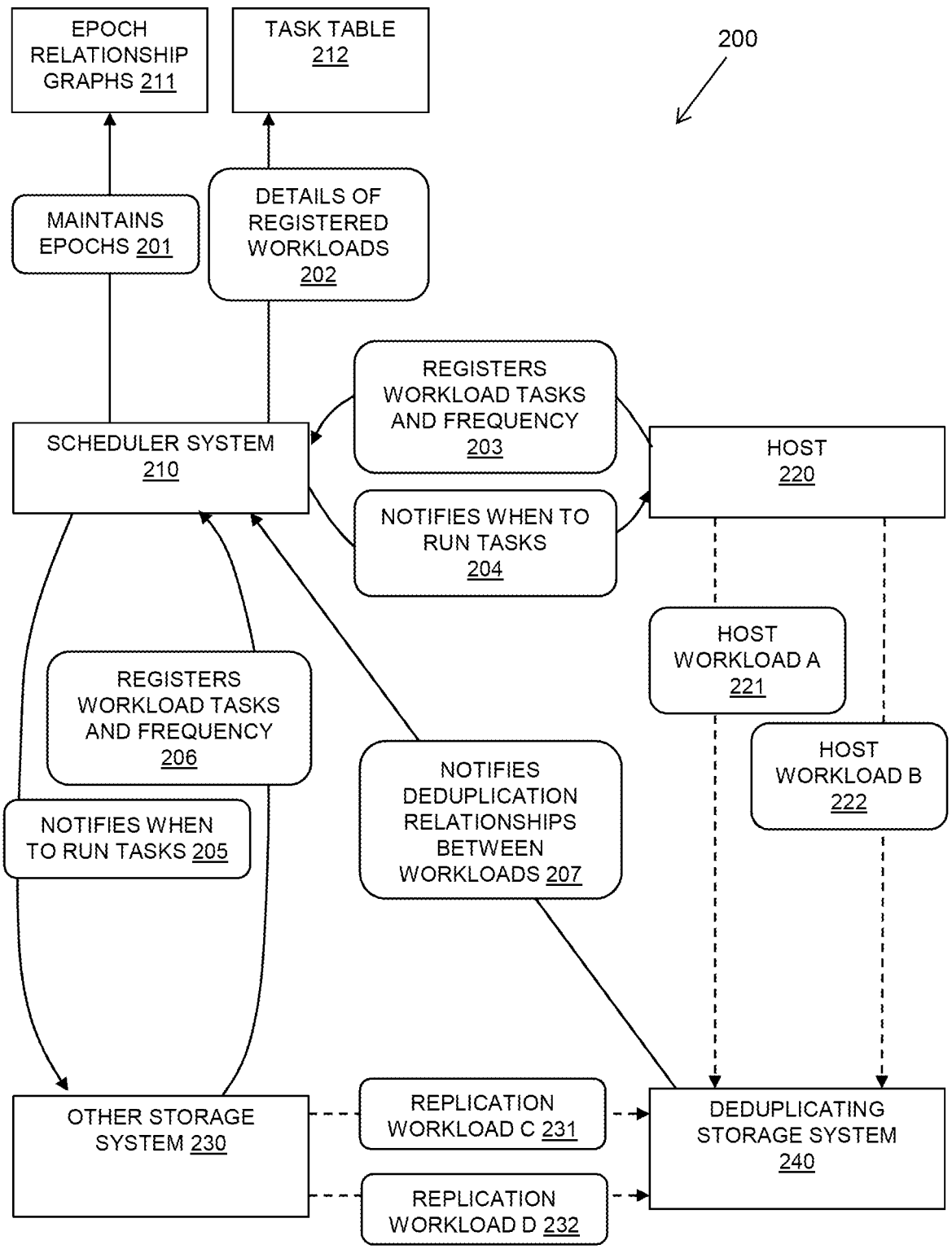
FIG. 2 depicts a flow diagram of an example embodiment of a method flow around components of an example embodiment of a system, in accordance with embodiments of the present disclosure.

Referring to FIG. 2, a block diagram 200 shows example system components illustrating a method flow in the system.

A deduplicating storage system 240 may be provided with a host 220 executing host workload A 221 and host workload B 222 on the deduplicating storage system 240. The deduplicating storage system 240 may operate with another storage system 230 providing replication workload C 231 and replication workload D 232 on the deduplication storage system 240.

A scheduler system 210 is provided with the described functionality, such as the functionality described in the method 100 of FIG. 1. The host 220 may register 203 workloads including tasks and frequency with the scheduler system 210, which may notify 204 the host 220 when to run tasks in the workloads. The storage system 230 may also register 206 workloads including tasks and frequency with the scheduler system 210, which may notify 205 the storage system 230 when to run tasks in the workloads.

The scheduler system 210 receives notifications 207 from the deduplicating storage system 240 of deduplication relationships between workloads in order to build and maintain 201 epoch relationship graphs 211. A task table 212 may also be maintained by the scheduler system 210 with details of registered workloads 202. The scheduler system 210 schedules the workload processes of hosts, like the host 220, and storage systems, like the storage system 230, to optimize the deduplication ratios between workloads.

As the scheduler system 210 may be a separate system from the deduplicating storage system 240, the scheduler system 210 may be used to identify workloads in a larger, distributed system which could otherwise be co-located/migrated.

The scheduler system 210 may also be leveraged in implementations such as three-site replication to allow scheduling knowledge based on deduplication behavior to be transferred across multiple deduplicating storage systems 240.

Figure 3A:
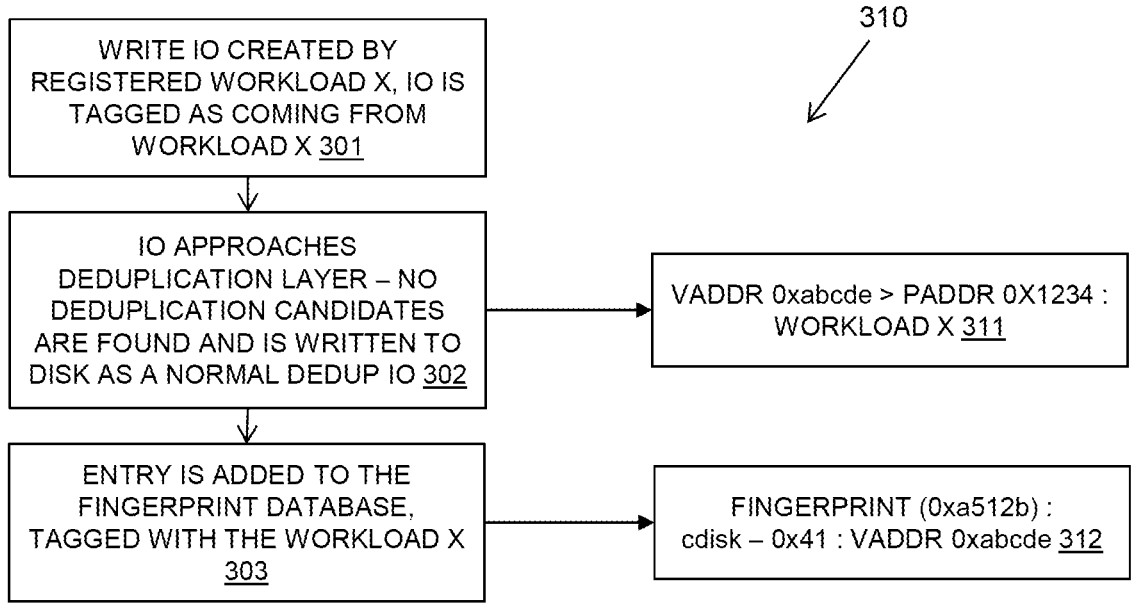
FIG. 3A depicts a flow diagram of an example embodiment of an aspect of a method, in accordance with embodiments of the present disclosure.
Figure 3B:
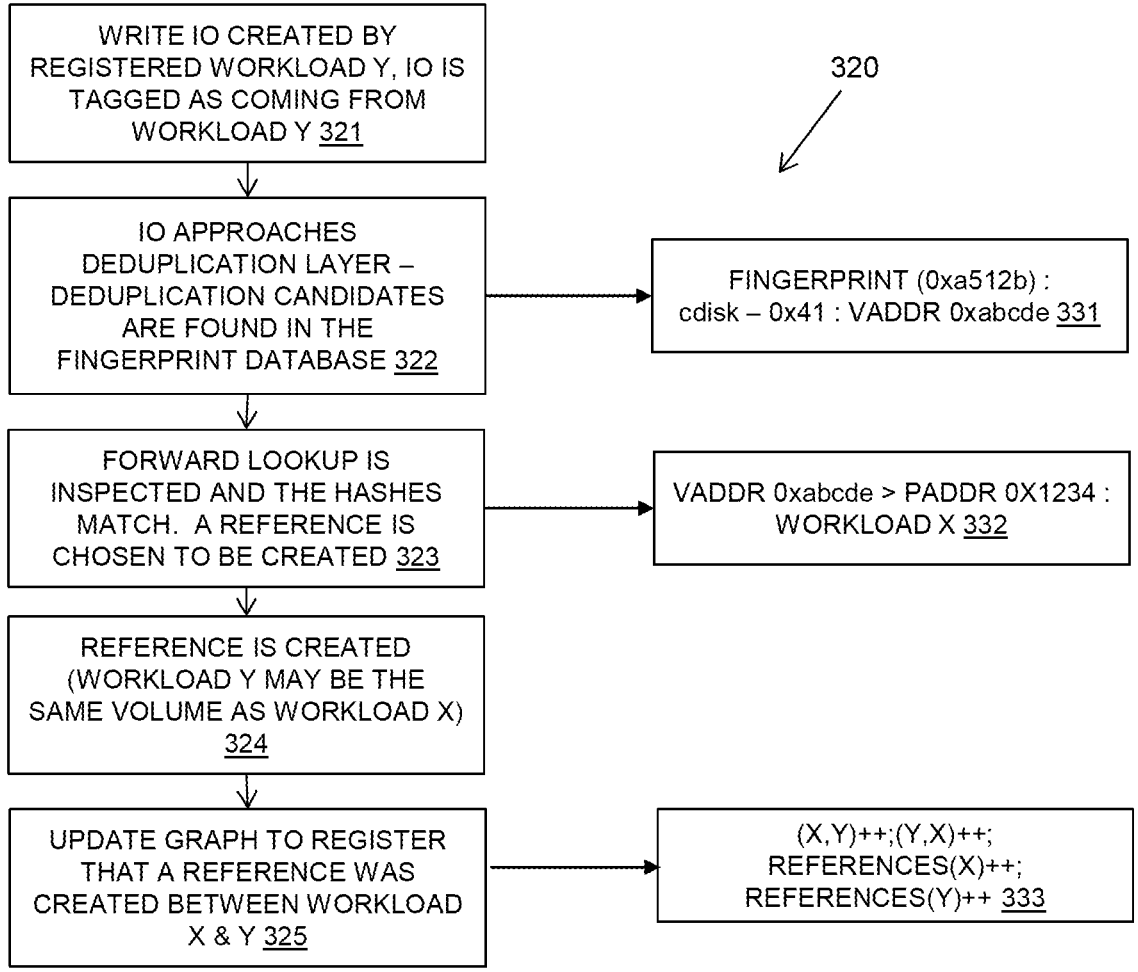
FIG. 3B depicts a flow diagram of an example embodiments of an aspect of a method, in accordance with embodiments of the present disclosure.

Referring to FIGS. 3A and 3B, flow diagrams 310, 320 show example embodiments of initial writes and reference creation and graph updates.

FIG. 3A shows a flow diagram 310 for initial writes. A write IO is received 301. The write IO is created by a registered workload X with the IO tagged as coming from workload X. The IO approaches 302 the deduplication layer and no deduplication candidates are found and therefore the IO is written to disk as a normal deduplication IO. A write forward lookup metadata is provided 311 as a virtual address mapping to a physical address with an indication of the workload X, "VADDR 0xabcde>PADDR X01234: WORKLOAD X".

The entry is added 303 to the fingerprint database and tagged with the workload that created it, X. The fingerprint database is updated 312, "FINGERPRINT (0xa512b): cdisk-0x41: VADDR 0xabcde".

FIG. 3B shows a flow diagram 320 for reference creation and updating of workload graphs for incoming IO writes.

A write IO is received 321. The write IO is created by a registered workload Y and the IO is tagged as coming from workload Y. The IO approaches 322 the deduplication layer. The fingerprint database is checked 331: "FINGERPRINT (0xa512b): cdisk-0x41: VADDR 0xabcde" and deduplication candidates are found in the fingerprint database.

The forward lookup is inspected 323 and the hashes match. A reference is chosen to be created. The forward lookup finds 332: "VADDR 0xabcde>PADDR 0X1234: WORKLOAD X".

A reference is created 324. Workload Y may be the same volume as workload X. The epoch graph is updated 325 to register that a reference was created between workload X and Y: "(X,Y)++;(Y,X)++; REFERENCES(X)++; REFERENCES(Y)++" 333.

Referring to FIGS. 4A-4D, an example embodiment shows a possible simple scheduling algorithm that attempts to optimize deduplication savings based on the creation of an epoch graph.

This example makes many assumptions; amongst them, that the chance of a reference surviving over time is uniform. More sophisticated approaches are possible, and this is a simple illustrative example of an approach attempting to optimize deduplications when scheduling jobs.

FIG. 4A shows an epoch graph 410 created from workloads that are monitored over the course of a time period, such as a few days or weeks. For simplicity in this example, it is assumed that the system can only support a single workload at a time. The problem can be easily extended to support co-scheduled, concurrent workloads under more sophisticated scheduling algorithms.

FIG. 4B, shows a fingerprint database 420 fixed in size at 1500 entries with a simulated state based on the epoch graph. The scheduling algorithm determines the next cycle of executions. For simplicity, it is assumed that each workload is scheduled once per cycle. As G has the most references, it is selected to run first 421.

FIG. 4C shows that the 906 entries belonging to G (i.e., the ones exceeding 1500 entries) are aged out 421. For this heuristic, it is assumed all entries belonging to the new workload survive, any existing ones are aged out with a survival chance proportional to their count. A has the highest number of references out of those referencing G, so it is scheduled next 422.

FIG. 4D shows that the next workload is now scheduled. To do this, the predicted fingerprint database counts are used to determine which workload to schedule next.

Notably, the epoch graph 410 may be used to indicate a probability of a reference being present. So, if there are 1500 references in the table belonging to G, and the epoch table suggests that workload D makes up 29% of the references G makes, it can be estimated that the D has 435 entries still in the table from G. It can also be calculated that, as A has an estimated 1000 entries, it contributes an additional 150 entries using a similar calculation. If this is done for each remaining candidate workload, D is found to be the best candidate 423.

A 422 and G 421 are therefore aged out, and D 423 is added to the schedule and fingerprint estimate. The scheduling algorithm may continue until all workloads are scheduled.

A method for workload scheduling in a storage system for optimized deduplication includes determining dynamic correlations of deduplications between workload processes in a prior time window. Workload processes include one or more task with defined execution timing parameters. The method includes scheduling multiple workload processes concurrently or in temporal proximity based on the correlations between workload processes in the time window and the defined execution timing parameters of the workload processes to achieve an optimized deduplication ratio between workload processes.

Figure 5:
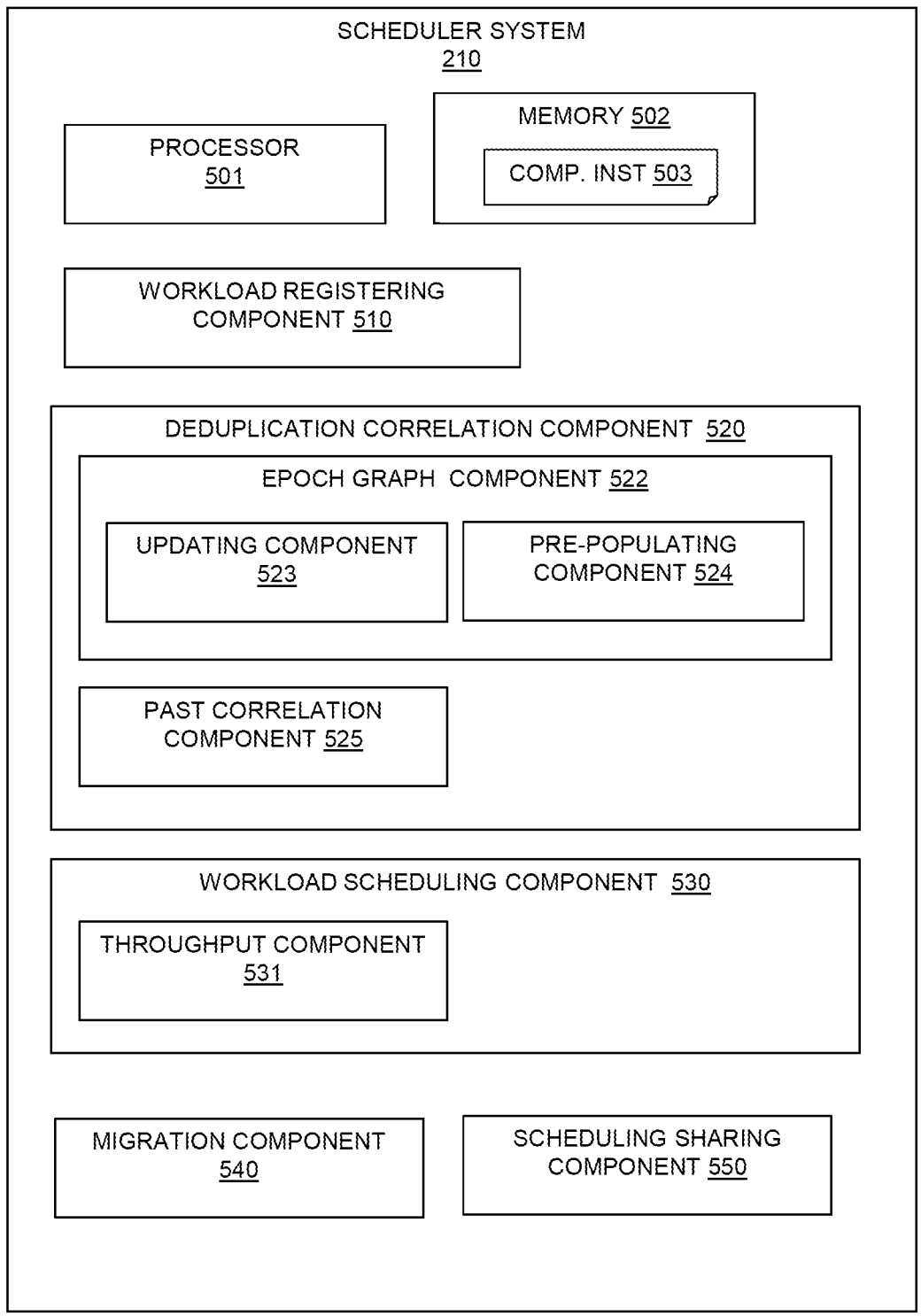
FIG. 5 depicts a block diagram of an example embodiment of a system, in accordance with embodiments of the present disclosure.

Referring to FIG. 5, an example embodiment of a scheduler system 210 is shown. The scheduler system 210 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The scheduler system 210 includes a workload registering component 510 for registering workload processes with the system including providing metadata of execution timing parameters associated with the task of the workload process.

The scheduler system 210 includes a deduplication correlation component 520 for determining dynamic correlations of deduplications between workload processes in a prior time window. The deduplication correlation component 520 includes an epoch graph component 522 for generating an epoch graph structure for multiple workload processes for a time window, wherein the epoch graph structure includes deduplication ratios based on past deduplications between the workload processes. The epoch graph component 522 may include an updating component 523 for populating the epoch graph when performing deduplication. The epoch graph component 522 may also include a pre-populating component 524 for pre-populating the epoch graph structure with known related workload processes.

The deduplication correlation component 520 may include a past correlation component 525 determining past deduplication correlations between workload processes by determining deduplications between two processes running within a defined time or within a defined throughput of each other, such that a deduplication database still contains an earlier workload process. The past correlation component 525 determines past deduplication correlations between workload processes by tagging input/output (IO) operations of a workload process in a deduplication database and counting deduplication references between workload processes.

The scheduler system 210 includes a workload scheduling component 530 for scheduling multiple workload processes concurrently or in temporal proximity based on the correlations between workload processes in the time window and the defined execution timing parameters of the workload processes to achieve an optimized deduplication ratio between workload processes.

The workload scheduling component 530 may include a throughput component 531 for factoring in throughput of a storage system over time when scheduling multiple workload processes including how the throughput is affected by the scheduling.

The workload scheduling component 530 may, for example, use a bin packing problem to find an optimal pack for workload processes given various time windows to maximize deduplication savings whilst still executing in the execution timing parameters.

The scheduler system 210 may be separate from a deduplication storage system and may include a migration component 540 for identifying workload processes in a distributed system which can be migrated to optimize deduplication.

The scheduler system 210 may include a scheduling sharing component 550 for transferring scheduling knowledge based on deduplication behavior to be transferred across multiple deduplicating storage systems.

Figure 6:
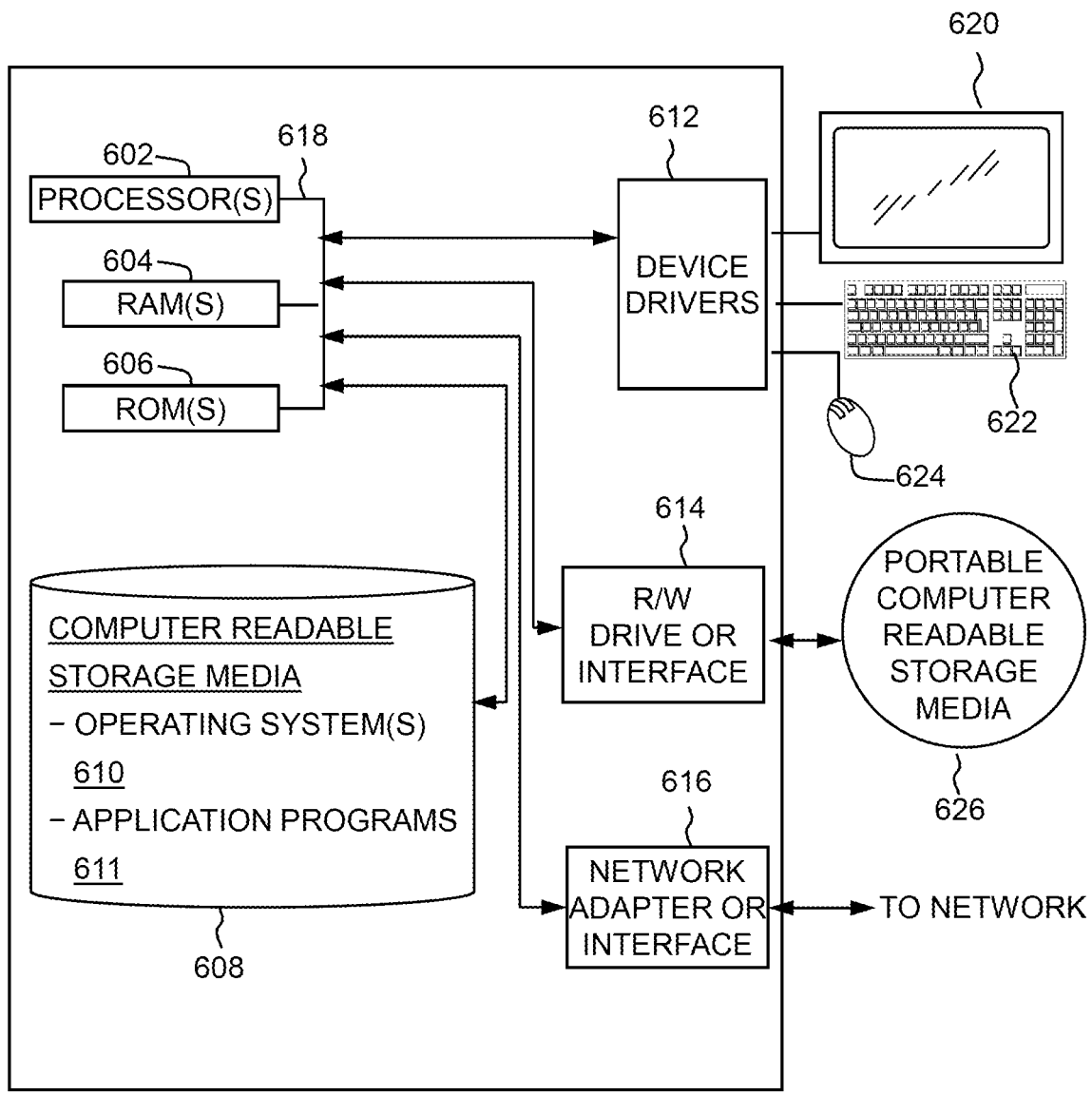
FIG. 6 illustrates a high-level block diagram of an example computer system that may be used in implementing one or more of the methods, tools, and modules, and any related functions, described herein, in accordance with embodiments of the present disclosure.

FIG. 6 depicts a block diagram of components of a computing system as used for the scheduler system 210, in accordance with an embodiment of the present disclosure. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications, and network processors, etc.), system memory, peripheral devices, and any other hardware components within the system.

One or more operating systems 610 and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
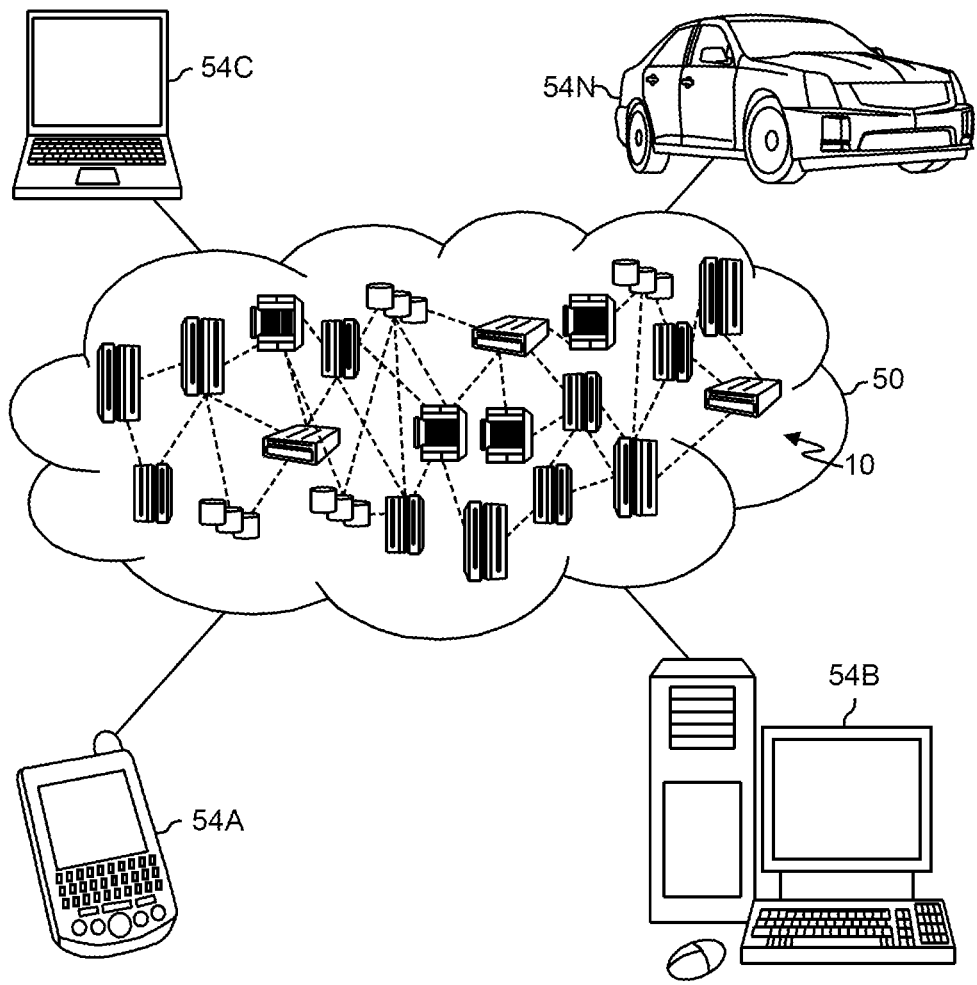
FIG. 7 depicts a cloud computing environment, in accordance with embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
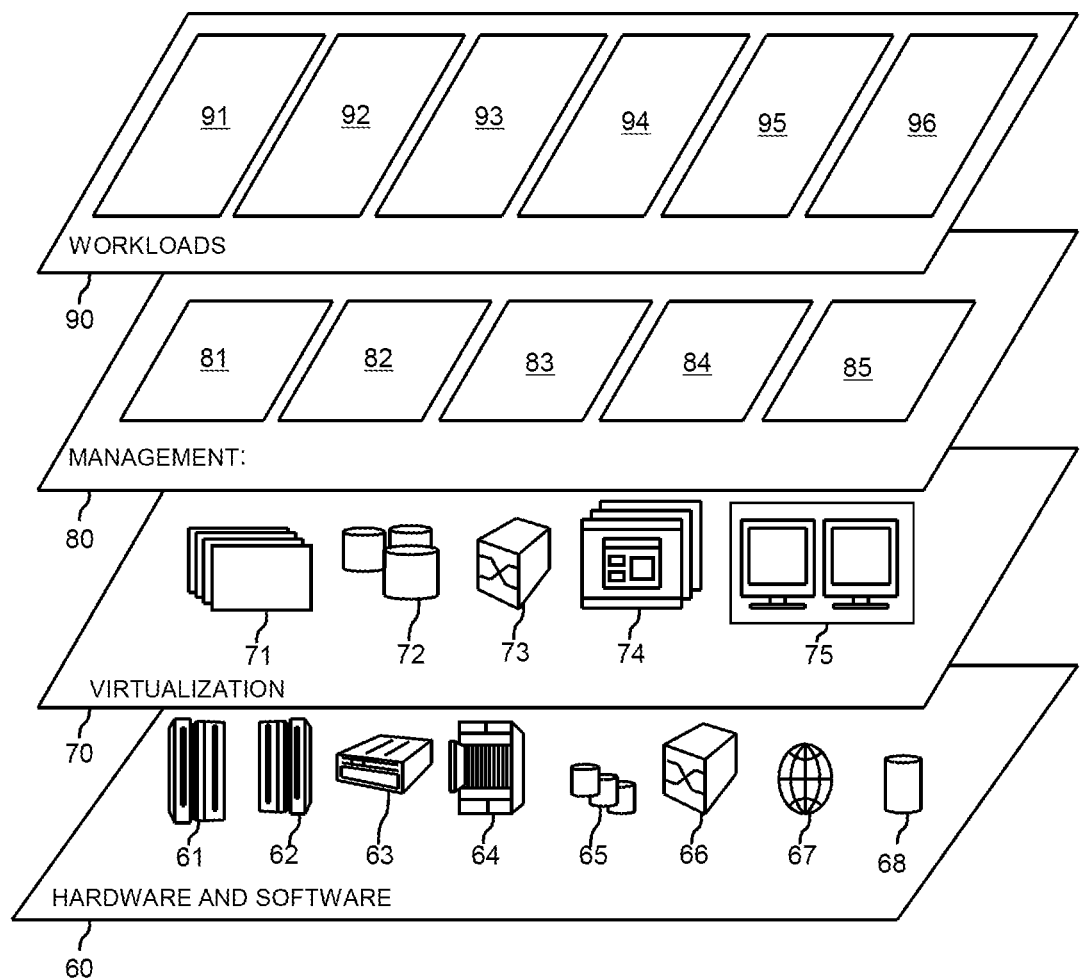
FIG. 8 depicts abstraction model layers, in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload scheduling processing 96.

A computer program product of the present disclosure comprises one or more computer readable hardware storage devices having computer readable program code stored therein, said program code executable by one or more processors to implement the methods of the present disclosure.

A computer system of the present disclosure comprises one or more processors, one or more memories, and one or more computer readable hardware storage devices, said one or more hardware storage device containing program code executable by the one or more processors via the one or more memories to implement the methods of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for workload scheduling in a storage system for optimized deduplication, comprising:
   determining dynamic correlations of deduplications between workload processes in a prior time window, including generating an epoch graph structure for multiple workload processes, wherein workload processes include one or more tasks with defined execution timing parameters;
   determining deduplication ratios based on the correlations of the deduplications between the workload processes; and
   scheduling multiple workload processes based on a highest determined deduplication ratio of the determined deduplication ratios, wherein:
   the epoch graph structure is generated for multiple workload processes for sliding time windows, and
   the epoch graph structure includes deduplication ratios based on past deduplications between the workload processes.

2. The method of claim 1, wherein:
   scheduling multiple workload processes includes scheduling multiple workload processes in temporal proximity.

3. The method of claim 1, wherein:
   scheduling multiple workload processes includes scheduling multiple workload processes concurrently.

4. The method of claim 1, further comprising:
   registering workload processes with a scheduler system including providing metadata of execution timing parameters associated with the task of the corresponding workload process.

5. The method of claim 1, wherein the execution timing parameters are used to determine an execution window for the workload tasks and the execution timing parameters include at least one of: an expected duration of the workload process, a minimum frequency of tasks in the workload process, or a desired execution time window.

6. The method of claim 1, wherein the prior time window is a sliding time window.

7. The method of claim 1, wherein the prior time window has one of a fixed time period and a variable time period depending on a throughput of the storage system.

8. The method of claim 1, further including:
   pre-populating the epoch graph structure with known related workload processes.

9. The method of claim 1, further including:
determining past deduplication correlations between workload processes by determining deduplications between two processes running within a defined time of each other, such that a deduplication database still contains an earlier workload process.

10. The method of claim 1, further including:
determining past deduplication correlations between workload processes by determining deduplications between two processes running within a defined throughput of each other such that a deduplication database still contains an earlier workload process.

11. The method of claim 1, further including:
determining past deduplication correlations between workload processes by tagging input/output (IO) operations of a workload process in a deduplication database and counting deduplication references between workload processes.

12. The method of claim 1, wherein scheduling multiple workload processes uses the epoch graph structure when scheduling to preferentially schedule highly related processes close to one another whilst fitting the execution timing parameters.

13. The method of claim 1, wherein scheduling multiple workload processes factors in throughput of a storage system over time and how throughput is affected by the scheduling.

14. The method of claim 1, wherein scheduling multiple workload processes uses a bin packing problem to find an optimal pack for workload processes given various time windows to maximize deduplication savings whilst still executing in the execution timing parameters.

15. The method of claim 1, wherein scheduling multiple workload processes is used to identify workload processes in a distributed system which can be migrated to optimize deduplication.

16. The method of claim 1, wherein the scheduling is leveraged to allow scheduling knowledge based on deduplication behavior to be transferred across multiple deduplicating storage systems.

17. A computer system, comprising:
a memory; and
a processor communicatively coupled to the memory, wherein the processor is configured to perform a method comprising:
determining dynamic correlations of deduplications between workload processes in a prior time window, including generating an epoch graph structure for multiple workload processes, wherein workload processes include one or more tasks with defined execution timing parameters;
determining deduplication ratios based on the correlations of the deduplications between the workload processes; and
scheduling multiple workload processes based on a highest determined deduplication ratio of the determined deduplication ratios, wherein:
the epoch graph structure is generated for multiple workload processes for sliding time windows, and
the epoch graph structure includes deduplication ratios based on past deduplications between the workload processes.

18. The computer system of claim 17, wherein:
the method further comprises registering workload processes with a scheduler system including providing metadata of execution timing parameters associated with the task of the workload process.

19. A computer program product comprising a computer readable storage medium having program instructions embodied therewith, the program instructions executable by processor to cause the processor to perform a method comprising:
determining dynamic correlations of deduplications between workload processes in a prior time window, including generating an epoch graph structure for multiple workload processes, wherein workload processes include one or more tasks with defined execution timing parameters;
determining deduplication ratios based on the correlations of the deduplications between the workload processes; and
scheduling multiple workload processes based on a highest determined deduplication ratio of the determined deduplication ratios, wherein:
the epoch graph structure is generated for multiple workload processes for sliding time windows, and
the epoch graph structure includes deduplication ratios based on past deduplications between the workload processes.

* * * * *